J. HUTTON.
Felly-Joint.
No. 206,455.   Patented July 30, 1878.
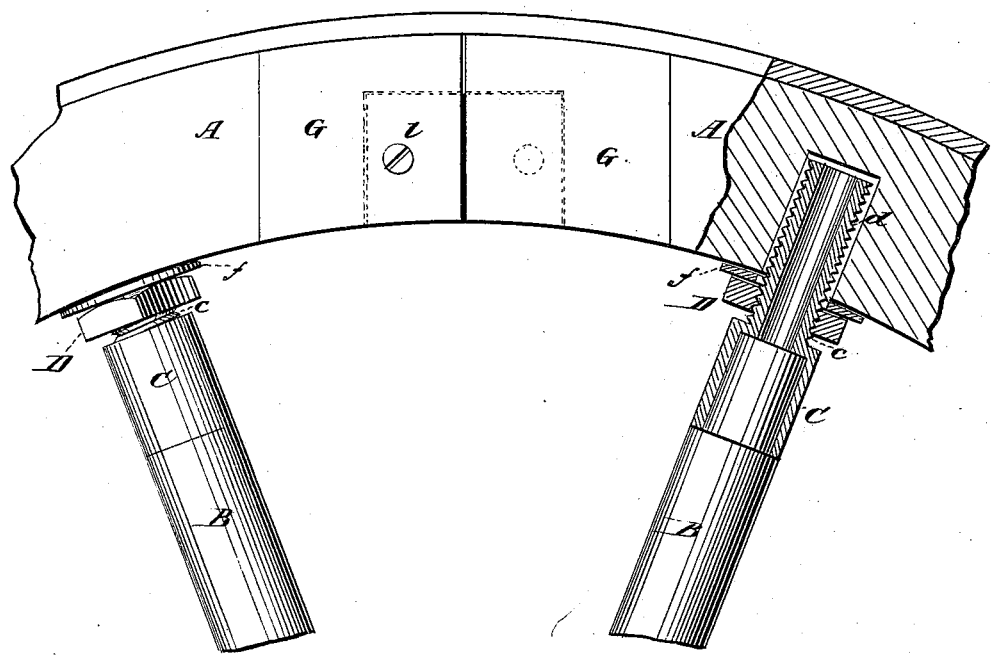
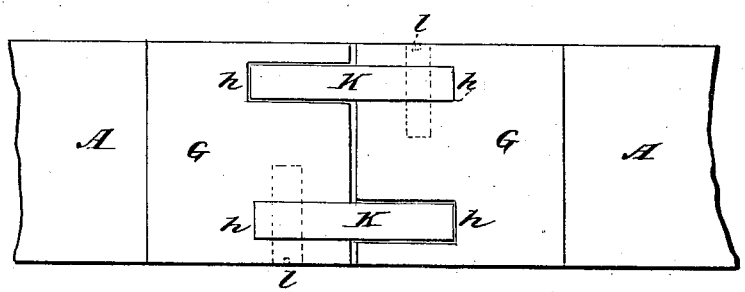
WITNESSES:
Francis McArdle
C. Sedgwick
INVENTOR:
J. Hutton
BY Munn & Co
ATTORNEYS.

UNITED STATES PATENT OFFICE.

JAMES HUTTON, OF DENVER, COLORADO.

IMPROVEMENT IN FELLY-JOINTS.

Specification forming part of Letters Patent No. 206,455, dated July 30, 1878; application filed May 6, 1878.

*To all whom it may concern:*

Be it known that I, JAMES HUTTON, of Denver, in the county of Arapahoe and State of Colorado, have invented a new and useful Improvement in Wheels for Vehicles, of which the following is a specification:

The invention will first be described in connection with the drawing, and then pointed out in the claims.

Figure 1 is a side view of a portion of a wheel constructed according to my invention, and Fig. 2 a view of the inner surface of the contiguous portions of two fellies.

Similar letters of reference indicate corresponding parts.

The felly A is provided with the usual chamber $a$ for the reception of the end of the spoke, and the spoke B may be attached to the hub in the usual or any suitable manner. C represents a metallic ferrule, formed to fit the outer end of the spoke, with its exterior surface flush with the surface of the spoke. The ferrule C is formed with an extension or shank, $c$, having an external screw-thread cut thereon. D is a nut, with its thread corresponding with that on the shank $c$.

The nut is placed on the shank $c$, and the felly is placed in position by inserting the shank $c$ in the chamber $a$. When the wheel is complete the fellies are tightened by turning each nut D so as to cause it to bear closely against the inner surface of the felly. If desired, a washer, $f$, may be interposed between the nut and the surface of the felly.

At each end of the felly A is fitted a cap, G, in which are two recesses, $h\ h$, for the reception of keys, consisting of iron strips, plates, or bars K K. The exterior surface of each cap when in place is flush with the surface of the felly, and the end of the cap is formed with a view of making it fit snugly against the end of the contiguous cap when the fellies are in place to form the wheel.

One of the keys K is secured in one of the recesses $h$ of a cap, G, by means of a screw, $l$, so that it may work freely in one of the recesses of the contiguous cap, and the other key is secured in the same way in the other recess of the second cap, so as to work freely in the other recess of the first cap, there being two keys and four recesses at each felly-joint, as shown in Fig. 2. By this mode of forming the felly-joint the proper connection of said joint is insured at all times, even in cases where the shrinking of the felly necessitates the tightening thereof to such an extent as to cause the ends of the two contiguous caps to separate from each other as the rim of the wheel is expanded by the tightening process, for the keys K K arranged in the recesses $h\ h$, as described, prevent any lateral displacement of the ends of the fellies, while at the same time they admit of an accurate longitudinal motion thereof in both directions, and thereby provide for both expansion and contraction.

I am aware of a patent in which is described the tightening of the felly by means of nuts in the chamber working in connection with a bolt-head and rubber springs, and also a patent in which is described the expanding of the rim by means of a bolt with right and left screw-threads forcing the contiguous ends of the fellies in opposite directions. I do not claim anything shown in either of said patents; but,

Having thus described my invention, what I claim as new, and desire to secure by Letters Patent, is—

1. The adjacent felly-caps G G of a vehicle-wheel connected by two keys, K K, arranged in opposite recesses of the caps and held by one screw, $l$, in each cap, as shown and described.

2. The combination, with wheel-fellies A and spokes B, of the adjustable spoke-thimble C, the caps G, and the keys K, as and for the purpose specified.

JAMES HUTTON.

Witnesses:
W. W. COOKE,
A. C. WOOLFOLK.